United States Patent [19]
Maury

[11] Patent Number: 5,441,171
[45] Date of Patent: Aug. 15, 1995

[54] AIR CANNON FOR REMOVING CAKES OF FLOWABLE MATERIAL AND CLEARING CLOGGED AREAS OF FLOWABLE MATERIAL

[76] Inventor: Hans-Dietmar Maury, Hindemithstrasse 5, 59227 Ahlen, Germany

[21] Appl. No.: 144,774

[22] Filed: Oct. 29, 1993

[30] Foreign Application Priority Data

Oct. 31, 1992 [DE] Germany .................. 42 36 896.0

[51] Int. Cl.⁶ ............................................. B65D 88/70
[52] U.S. Cl. ............................................. 222/3; 222/195
[58] Field of Search ................. 222/195, 3, 196; 406/85, 136, 137

[56] References Cited

U.S. PATENT DOCUMENTS

| | | | |
|---|---|---|---|
| 3,788,527 | 1/1974 | Matson | 222/195 |
| 3,915,339 | 10/1975 | Matson | 222/3 |
| 3,942,684 | 3/1976 | Stetson | 222/3 |
| 4,051,982 | 10/1977 | Stetson | 222/195 |
| 4,346,822 | 8/1982 | Wadensten et al. | 222/195 |
| 4,469,247 | 9/1984 | Tompkins | 222/195 X |
| 4,496,076 | 1/1985 | Tompkins | 222/195 X |
| 4,579,138 | 4/1986 | Simoens | 222/195 X |
| 4,676,402 | 6/1987 | Stetson | 222/195 X |
| 4,703,869 | 11/1987 | De Rooy | 222/195 X |
| 4,767,024 | 8/1988 | Rappen | 222/195 X |
| 4,817,821 | 4/1989 | Simoens | 222/195 X |
| 4,826,051 | 5/1989 | Milian | 222/195 |
| 5,143,256 | 9/1992 | Wadensten | 222/195 X |

FOREIGN PATENT DOCUMENTS

| | | | |
|---|---|---|---|
| 586090 | 11/1987 | Australia . | |
| 951692 | 7/1974 | Canada | 222/195 |
| 0066795 | 12/1982 | European Pat. Off. . | |
| 0134726 | 3/1985 | European Pat. Off. . | |
| 0324368 | 7/1989 | European Pat. Off. . | |
| 2000808 | 7/1971 | Germany . | |
| 3602207 | 3/1989 | Germany . | |

OTHER PUBLICATIONS

"Sicherer Betrieb und zuverlassige Funktion" Shock Blower von Agrichema.

*Primary Examiner*—Andres Kashnikow
*Assistant Examiner*—Lisa Douglas
*Attorney, Agent, or Firm*—Robert W. Becker & Associates

[57] ABSTRACT

An air cannon for removing cakes of flowable material and clearing clogged areas of flowable material in silos, heat exchanger and lines has a pressure container for storing compressed air and a pressure source connected to the pressure container. An outlet valve is connected to the pressure container. An outlet jet is connected to the outlet valve. The outlet valve has a valve housing and a piston, wherein the valve housing has a guide in which guide the piston is axially slidable. An annular channel is formed between the valve housing and the guide. The annular channel is connected to the pressure container and, in the open position of the outlet valve, forms a cylindrical opening that opens into the outlet jet. The piston has a forward end face facing the outlet jet and having an annular valve sealing surface. The rearward end face of the piston is subjected to a suddenly releasable closure pressure. A pressure present in the outlet jet acts on the area enclosed by the annular sealing surface, and a pressure of the pressurized container acts on the area surrounding the annular sealing surface.

14 Claims, 2 Drawing Sheets

AIR CANNON FOR REMOVING CAKES OF FLOWABLE MATERIAL AND CLEARING CLOGGED AREAS OF FLOWABLE MATERIAL

BACKGROUND OF THE INVENTION

The present invention relates to an air cannon for removal of cakes of flowable material and clearing clogged areas of flowable material in silos, heat exchangers, lines etc. with the aid of air blasts. The air cannon has a pressure container for storage of compressed air, an outlet jet as well as an outlet valve arranged between the pressure container and the outlet jet for ejecting the compressed air, whereby the outlet valve comprises a valve housing as well as a piston that is axially slidably guided in a guide and is exposed with its rearward to a suddenly releasable closure pressure. The piston has at its forward end that is facing the outlet jet an annular valve sealing surface. The pressure present at the outlet jet acts on an area enclosed by the annular valve sealing surface, and the pressure present within the pressure container acts on an area surrounding the annular valve sealing surface.

Air cannons are devices for generating impulse-type air blasts of high energy density. These air blasts are used to remove caked flowable material or to clear clogged areas of flowable material within silos, heat exchangers, lines of processing plants, cyclones, oven inlets, etc. in periodic time intervals or whenever needed. For this purpose, compressed air within a pressure container is suddenly released via an outlet valve with a great outlet cross-section and expanded. The thus released pressure energy loosens the caked flowable material in the aforementioned devices.

The dimensions as well as the design of the outlet valve employed are very important for the magnitude of the air blast impulse to be generated with such air cannons. From European patent 0 134 726 an air cannon is known in which the outlet valve is a component in which the inlet line coming from the pressurized container is arranged perpendicularly to the outlet jet. This arrangement results in considerable flow and throttle losses for the air exiting through the open outlet valve. Similar disadvantages are also present for the embodiment and guiding of the valve body which is essentially designed as a valve plate with an outer collar and an inner collar. With the inner collar the valve plate rests in its closing position on an annular valve seat of the outlet jet, while the outer collar serves for guiding the valve plate within the valve housing. This known outlet valve forces the air to flow such that first the air is deflected by 90° and subsequently, when entering the outlet jet, is again deflected by 180°.

Another air cannon is known from German patent 36 02 207 in which the valve seat is formed by the end of the outlet tube whereby this end of the tube is arranged at the level of the central axis of the inlet line coming from the pressure container. In this manner, a great portion of the pressurized air existing through the open outlet valve is open is only deflected once by 90°. However, since in this construction the outlet tube also partially extends into the inlet line, undesirable flow and pressure losses occur in the area of the collar-shaped valve seat.

Another air cannon is known from the brochure titled "Luftstoβgeräte: Sicherer Betrieb und zuverlässige Funktion" of Agrichema Materialfluβtechnik GmbH. This device has an outlet valve, which is arranged within the pressure container, and an annular valve sealing surface whereby the compressed air flows radially onto the valve sealing surface so that in this case also a deflection of the flow about 90° results. However, in this case the required collar of the outlet tube known from the aforementioned construction is eliminated. Disadvantageously, the outflow with this known outlet valve does not occur uniformly over the entire valve cross-section: Over the circumference of the valve sealing surface a plurality of outlet openings with interposed stays are provided. The stays are extensions of the valve housing of the outlet valve and connect the valve housing with the valve seat. These stays are very unfavorable with respect to flow dynamics because they present a surface perpendicular to the flow direction causing a considerable pressure loss and thus a weakening of the producible air impulse. Furthermore, the arrangement of the outlet valve within the pressure container is disadvantageous with respect to control and servicing of the device. In this context it is important to realize that such pressure containers are subject to the respective pressure container regulations and ordinances and therefore cannot be opened at will.

It is therefore an object of the present invention to provide an air cannon for removal of caked flowable material and clearing of clogged areas of flowable material which is simple in its construction and which generates an especially strong air impulse or air blast.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
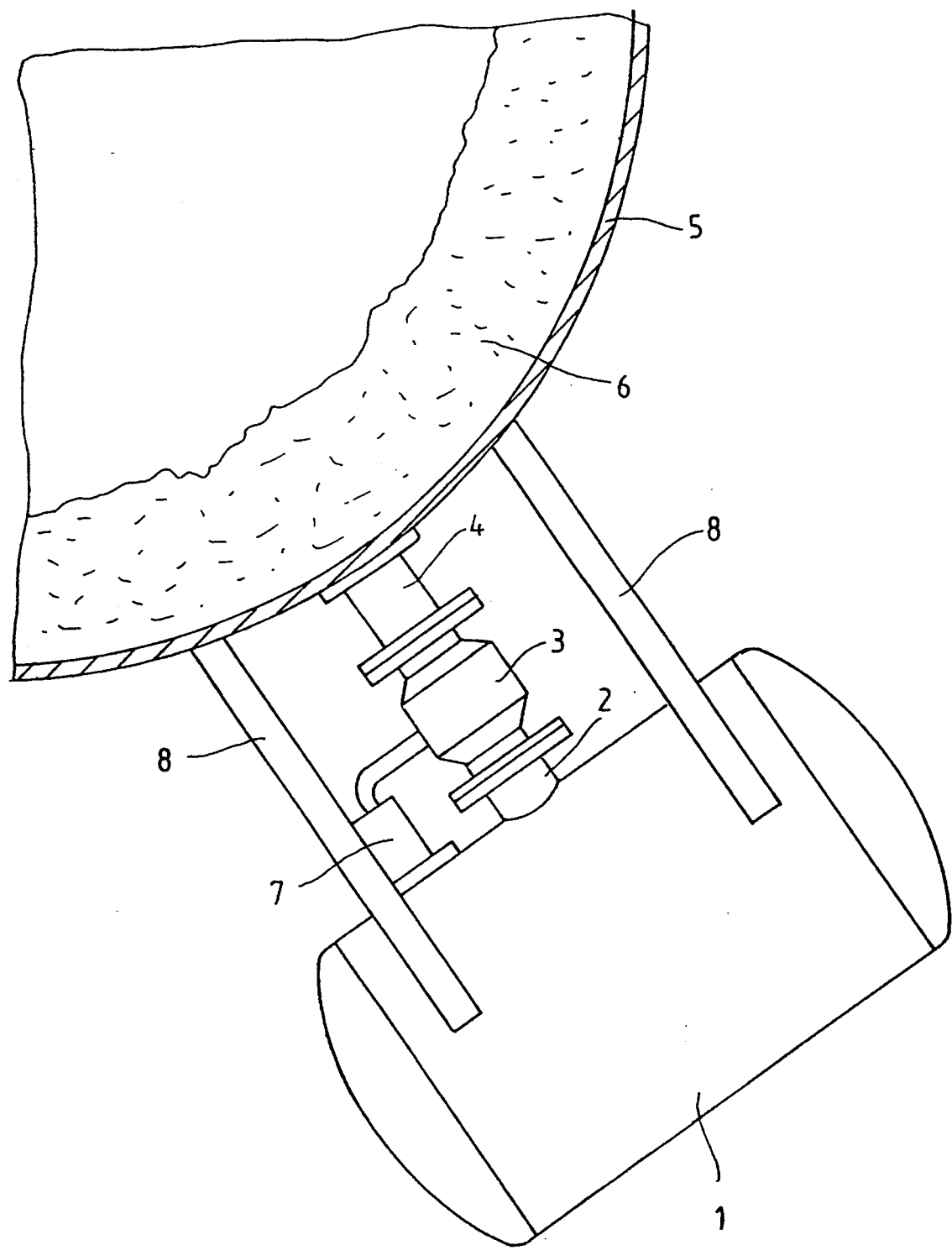
FIG. 1 is a plan view of the arrangement and attachment of an air cannon at the outer mantle of a container for flowable material, partially shown in section.

The air cannon for removing cakes of flowable material and clearing clogged areas of flowable material according to the present invention is primarily characterized by:

A pressure container for storing compressed air;

A pressure source connected to the pressure container;

An outlet valve connected to the pressure container;

An outlet jet connected to the outlet valve;

The outlet valve comprising a valve housing and a piston, wherein the housing has a guide in which guide the piston is axially slidable;

An annular channel formed between the valve housing and the guide, the annular channel connected to the pressure container and, in an open position of the outlet valve, forming a cylindrical opening that opens into the outlet jet; and The piston having a forward end face facing the outlet jet, the forward end face having an annular valve sealing surface and a rearward end face on which rearward end face a suddenly releasable closure pressure acts, wherein a pressure in the outlet jet acts on an area enclosed by the annular sealing surface and wherein a pressure of the pressure container acts on an area surrounding the annular sealing surface.

Preferably, the outlet valve has a piston housing connected within the valve housing, the piston housing being the guide and forming a substantially symmetrically arranged flow body within the valve housing.

The piston housing expediently comprises radially extending stays with which stays the piston housing is connected to the valve housing such that the annular channel is formed. The piston housing has a substantially conically shaped end face remote from the piston.

The air cannon preferably further comprises a switchable 3/2-way valve connected to the pressure source. At least one of the stays has a connecting channel for connecting the 3/2-way valve to the interior of the piston housing.

In a preferred embodiment of the present invention, the piston and the piston housing each have a hollow interior and the hollow interiors together form a storage volume.

Preferably, the annular channel opens at a first angle of 25° to 75° relative to the axis of the piston toward the outlet jet. Expediently, the annular valve sealing surface is slanted at a second angle of 25° to 75° relative to the axis of the piston into the outlet jet. In the alternative, the outlet valve has a valve seat cooperating with the annular valve sealing surface, wherein the valve seat extends at a third angle of 25° to 75° relative to the axis of the piston into the outlet jet. It is also possible that in this embodiment the annular valve sealing surface is also slanted at a second angle of 25° to 75° relative to the axis of a piston toward the outlet jet.

In a preferred embodiment of the present invention, the outlet valve has a valve seat cooperating with the annular valve sealing surface, and the outlet valve comprises a flange detachably connected to the valve housing. The valve seat in this embodiment is provided at the flange. Preferably, the device further comprises a jet body enclosing the outlet jet that is connected to the flange.

Preferably, the valve housing has an inlet opening coaxially arranged relative to an axis of the piston, the inlet opening widening within the valve housing into the annular channel.

Advantageously, the air cannon further comprises a differential pressure valve for reducing a pressure in the pressure container when a preset pressure differential between the pressure in the pressure container and the closure pressure acting on the rearward end face of the piston is surpassed.

In another preferred embodiment of the present invention, the air cannon further comprises an air cushion damping means connected within the piston housing for damping or movement of the piston.

According to the present invention it is suggested that between the valve housing and the guide for the piston an annular channel is provided that communicates with the pressure container. The annular channel, when the outlet valve is in its open position, opens in the form of a completely cylindrical opening into the outlet jet.

With the inventive design of an air cannon the compressed air can reach the outlet jet without having to overcome obstacles in the form of inserts. Since the mouth of the annular channel is in the form of a completely cylindrical opening a uniform flow of the compressed air from all sides is possible in direction to the centrally arranged outlet jet. Since the flow of the compressed air takes place via an annular channel arranged between the valve housing and the guide for the piston, not only the uniform flow to the valve seat from all sides is ensured, but the flow is also made more uniform over the entire circumference before reaching the valve seat. Since in this manner flow losses are prevented, it is possible to expand the compressed air of the pressurized container with this air cannon in a shortest possible time. Thus, it is possible to generate a particularly strong air blast or air impulse.

The guide for the piston is preferably provided at the piston housing which forms within the valve housing an almost completely symmetrically arranged flow body. This also results in a more uniform flow over the circumference of the outlet valve. Furthermore, with this embodiment and arrangement of the piston housing within the valve housing the so-called flow-dynamical paradox effect is being used according to which for a respective embodiment of a flow body the force of the impact pressure is approximately identical to the force which is generated at the rearward end of the flow body (in the direction of flow) due to the dynamic pressure present there. Such a flow body, in the ideal case, is substantially without resistance within the flow.

It is furthermore advantageous when the piston housing is connected with radial stays to the valve housing such that the annular channel is defined therebetween. Furthermore, it is advantageous when its end face facing away from the piston tapers off conically. The radially extending stays are preferably provided with a flow-dynamically optimized cross-section, for example, in a droplet shape, and thus cause only a neglectable flow resistance within the annular channel. Due to the embodiment of the end face of the piston housing in the form of a cone or a spherical cap etc., the impact pressure generated here can be limited when the outlet valve is open.

Preferably, at least one of the stays is provided with a connecting channel via which the interior of the piston housing is in connection with a switchable 3/2-way valve. Accordingly, the stays, in addition to their function of supporting the piston housing within the valve housing, also have the function of a connecting line to the 3/2-way valve. By switching the 3/2-way valve into its venting position, the piston housing is vented so that now the highly compressed air acting in the area of the valve sealing surface determines the pressure force on the piston and suddenly returns the piston such that the valve cross-section is opened.

The flow conditions within the outlet valve can be further improved when the annular channel opens with an angle of 25° to 75° relative to the axis of the piston into the outlet jet.

In this case it is advantageous when the valve sealing surface and/or the cooperating valve seat also are slanted at the same angle.

A simple adaptation of the air cannon to varying operational conditions is possible by providing the valve seat cooperating with the annular valve sealing surface of the piston at a flange which is detachably connected to the valve housing. By selecting a respective flange, the size of the outlet opening and thus the force of the air blast can be adjusted. Furthermore, after removal of the flange the piston is easily replaceable.

It is furthermore suggested with the present invention that a jet body enclosing the outlet jet is connected to the flange.

It is advantageous that the valve housing is provided with an inlet opening coaxially arranged to the longitudinal piston axis which widens within the valve housing into the annular channel. This results in a symmetrical and uniform inflow, through flow, and outflow of the outlet valve and thus in a particularly low-loss guiding of the flow.

In a preferred embodiment of the invention it is suggested that the piston and the corresponding piston housing are hollow, with the required material thickness for the walls remaining, and form a common storage volume. The advantage of this storage volume is that slight leakage of air acting on the rearward end face of the piston does not result in a dangerous plunge of the closure pressure which would cause an immediate opening of the outlet valve and thus in the release of an uncontrolled air blast. For increasing the safety of the air cannon, it is furthermore suggested in another embodiment of the present invention to provide a differential pressure valve which, when a predetermined pressure differential between the pressure in the pressure container and the closure pressure acting on the rearward end face of the piston is surpassed, reduces the pressure within the pressure container. This ensures that the closure pressure acting on the rearward end face of the piston at all times is greater than the pressure acting on the forward end face of the piston so that the piston cannot be returned to accidentally open the outlet valve.

In a further embodiment of the present invention the air cannon comprises an air cushion damping means for damping the movement of the piston. The damping means is arranged within the piston housing. This arrangement reduces the mechanical load on the piston and the piston housing and ensures a permanent and secure operation of the air cannon.

DESCRIPTION OF PREFERRED EMBODIMENTS

The present invention will now be described in detail with the aid of several specific embodiments utilizing FIGS. 1 and 2.

FIG. 1 shows an air cannon comprising a pressure container 1 for compressed air to which an outlet valve 3 is connected with an intermediate piece 2 and respective flange connections. The jet body 4 extends from the outlet valve 3 into the interior of a container 5 for flowable material. Cakes 6 of flowable material which are adhered to the inner wall surface of the container 5 are removed by impulse-type air blasts generated by the air cannon and ejected from the jet body 4. The actuation of the outlet valve 3 is carried out with a control device 7 that is connected to the mantle of the pressure container 1. The pressure container 1 is connected with supports 8 at the outer mantle of the container 5. Other means of fastening, for example, by suspending with steel cables, are also possible.

Figure 2:
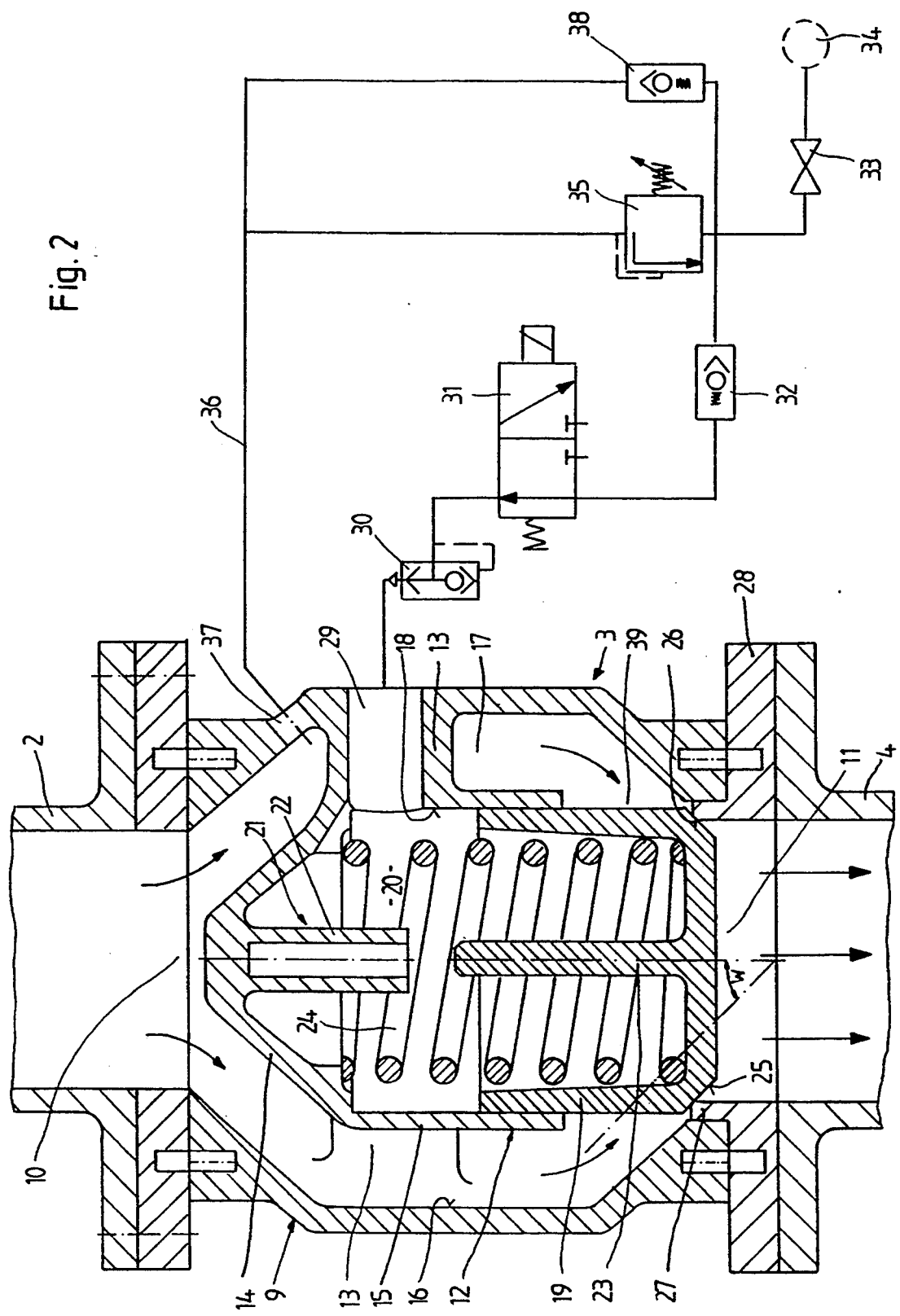
FIG. 2 shows a cross-sectional view of the outlet valve of the air cannon according to FIG. 1 together with a circuit diagram for controlling the outlet valve.

Details of the outlet valve 3 are represented in the left portion of FIG. 2. The outlet valve 3 is comprised of a valve housing 9 and an inlet opening 10 as well as an outlet opening 11 which outlet opening 11 acts simultaneously as the outlet jet 11 for the compressed air that is guided via the tubular intermediate piece 2 from the pressure container 1 into the outlet valve 3. The greatest portion of the outlet jet 11 is defined by the downstream jet body 4.

The valve housing 9 is comprised of a one-piece cast part in which a piston housing 12 is provided that is centrally arranged relative to the longitudinal axis of the valve housing 9. The piston housing 12 is coaxially arranged within the valve housing 9 and is connected with it via radially arranged, cast stays 13. The piston housing 12 has a forward side, in FIG. 2 the upper side, in the shape of a cone 14 to which a cylindrical section 15 is connected. The inner wall surface 16 of the valve housing 9 is formed such that it corresponds substantially to the outer shape of the piston housing 12 so that between the valve housing 9 and the piston housing 12 an annular channel 17 results that has over its circumference a uniform cross-sectional area. The flow cross-section defined by the annular channel 17 is only slightly affected by the stays 13 which are shaped in the form of flow profiles. In order to minimize the effect of turbulences on the flow behavior within the area of the outlet jet 11, the stays 13 are arranged at the upper end (with respect to FIG. 2) of the valve housing 9, i.e., remote from the outlet jet 11.

The inner wall surface of the piston housing 12, in the area of the cylindrical section 15, is provided with a guide 18 along which the piston 19 glides in the axial direction. The piston 19 is cup-shaped whereby its hollow interior together with the interior of the piston housing 12 forms a common storage volume 20. For achieving a maximized storage volume 20, the material thickness of the walls of the piston 19 and piston housing 12 are reduced to the required minimum.

Within the piston housing 12 an air cushion damping means 21 is arranged which is comprised of a damping cylinder 22 and a cooperating damping piston 23. On its rearward end face, i.e., the side facing the inlet opening 10, a pressure spring 24 is resting at the piston 19 which biases the piston into its closed position.

At the forward end face of the piston 19 that is facing the outlet jet 11 the piston 19 is provided with an annular valve sealing surface 25 which has a slant of 45°. A corresponding slant is also provided at the valve seat 26 cooperating with the valve sealing surface 25. The valve seat 26 is formed on a flange 28 which with its collar 27 extends into the valve housing 9. The outer diameter of the collar 27 is slightly greater than the diameter of the guide 18 and the piston 19 so that for repair work or disassembly the piston 19 can be easily removed from the valve housing 9 after removal of the flange 28.

The circumference of the inner wall surface 16, respectively, the annular channel 17 of the valve housing 9, in the vicinity the valve seat 26 is slanted at an angle of substantially 45° relative to the longitudinal axis of the piston. This angle corresponds to the opening angle w of the valve so that for an open valve the air flowing via the annular channel 17 through the valve 3 reaches the outlet jet 11 at the same angle. Due to the small deflection angle only small flow losses will result.

The storage volume 20 is connected via a connecting channel 29 in one of the stays 13 and via a quick release valve 30 with a 3/2-way valve 31. The 3/2-way valve 31 in its rest position represented in FIG. 2 is connected via a check valve 32 and a throttle valve 33 to a pressure source 34. A pressure regulator 35 is provided between the pressure source 34 and the pressure container containing the pressed air. The corresponding line 36 opens in the shown embodiment via a bore 37 into the annular channel 17. However, it may be directly connected to the pressure container 1.

Parallel to the pressure regulator 35 a differential pressure valve 38 is provided.

The inventive air cannon operates in the following manner:

For filling the pressure container 1 the compressed air provided by the pressure source 34 is guided via the 3/2-way valve 31 into the storage volume 20. This, in connection with the closure force of the pressure spring 24, results in a displacement of the piston 19 into the closed position represented in FIG. 2. At the same time, via the pressure regulator 35 and the bore 37, the pressure container 1 is filled until the desired pressure is reached. The piston 19 remains automatically in its closed position since the backside of the piston 19 is exposed to a force that is greater than the force acting on its forward side. The backside of the piston is exposed to the closure pressure within the storage volume 20 while the forward side of the piston 19 is exposed only to the pressure present within the area surrounding the effective valve sealing surface 25 by the pressure present in the pressure container 1. The area enclosed by the valve sealing surface 25 is exposed only to the atmospheric pressure within the outlet jet 11. This results in a force acting in the closing direction of the piston 19.

This closing force is maintained even when slight leakage occurs, for example, in the area of the quick release valve 30 or the 3/2-way valve 31, because the closure pressure is decreased only slowly due to the relatively great storage volume 20. Furthermore, the differential pressure valve 38 ensures that the pressure within the storage volume 20 does not fall below a pressure within the pressure container 1.

By opening the 3/2-way valve 31, the air stored within the storage volume 20 can be suddenly released so that the aforementioned force balance at the piston 19 is reversed. Suddenly, the piston 19 is forced into its rearward position due to the pressure within the pressure container 1 acting on the forward side of the piston 19 so that the air contained within the pressure container 1 is suddenly ejected via the now open, completely cylindrical opening 39 into the outlet jet 11. Only very slight pressure losses occur so that overall an impulse-strong air blast for removal of cakes 6 of flowable material is generated.

The present invention is, of course, in no way restricted to the specific disclosure of the specification and drawings, but also encompasses any modifications within the scope of the appended claims.

What I claim is:

1. An air cannon for removing cakes of flowable material and clearing clogged areas of flowable material in silos, heat exchangers, and feed lines with an air blast; said air cannon comprising:
    a pressure container for storing compressed air;
    a pressure source connected with a first line to said pressure container;
    an outlet valve connected to said pressure container;
    an outlet jet connected to said outlet valve;
    said outlet valve comprising a valve housing and a piston, wherein said valve housing has a guide in which said piston is axially slidable;
    an annular channel formed between said valve housing and said guide, said annular channel connected to said pressure container and, in an open position of said outlet valve, forms a cylindrical opening that opens into said outlet jet;
    said piston having a forward end face facing said outlet jet, said forward end face having an annular valve sealing surface, and a rearward end face on which a suddenly releasable closure pressure acts, wherein, when said outlet valve is closed, a pressure present in said outlet jet acts on an area surrounded by said annular sealing surface and wherein a pressure of said pressure container acts on an area outside of said annular sealing surface;
    said outlet valve having a piston housing with radially extending stays and connected with said stays inside said valve housing, said piston housing being said guide;
    a storage volume provided at said rearward end face of said piston, wherein said pressure source is connected with a second line to said storage volume;
    a connecting channel for connecting said second line to said storage volume provided in at least one of said stays; and
    said second line comprising a switchable valve which in a rest position connects said pressure source to said storage volume and which in a venting position opens a cross-section through which compressed air is vented from said storage volume.

2. An air cannon according to claim 1, wherein said piston housing forms a substantially symmetrically arranged flow body within said valve housing.

3. An air cannon according to claim 2, further comprising an air cushion damping means, connected within said piston housing, for damping a movement of said piston.

4. An air cannon according to claim 1, wherein said piston housing is connected to said valve housing with said stays such that said annular channel is formed, said piston housing having a substantially conically shaped end face remote from said piston.

5. An air cannon according to claim 1, wherein said switchable valve is a 3/2-way valve.

6. An air cannon according to claim 1, wherein said piston and said piston housing each have a hollow interior and said hollow interiors together form said storage volume.

7. An air cannon according to claim 1, wherein said annular channel opens at a first angle of 25° to 75° relative to an axis of said piston into said outlet jet.

8. An air cannon according to claim 7, wherein said annular valve sealing surface is slanted at a second angle of 25° to 75° relative to said axis of said piston toward said outlet jet.

9. An air cannon according to claim 7, wherein said outlet valve has a valve seat cooperating with said annular valve sealing surface, wherein said valve seat extends at third angle of 25° to 75° relative to said axis of said piston into said outlet jet.

10. An air cannon according to claim 9, wherein said annular valve sealing surface is slanted at a second angle of 25° to 75° relative to said axis of said piston toward said outlet jet.

11. An air cannon according to claim 1, wherein said outlet valve has a valve seat cooperating with said annular valve sealing surface and wherein said outlet valve further comprises a flange detachably connected to said valve housing, said valve seat provided on said flange.

12. An air cannon according to claim 11, further comprising a jet body enclosing said outlet jet and connected to said flange.

13. An air cannon according to claim 1, wherein said valve housing has an inlet opening coaxially arranged relative to an axis of said piston, said inlet opening widening within said valve housing into said annular channel.

14. An air cannon for removing cakes of flowable material and clearing clogged areas of flowable material in silos, heat exchangers, and feed lines with an air blast; said air cannon comprising:
   a pressure container for storing compressed air;
   a pressure source connected with a first line to said pressure container;
   an outlet valve connected to said pressure container;
   an outlet jet connected to said outlet valve;
   said outlet valve comprising a valve housing and a piston, wherein said valve housing has a guide in which said piston is axially slidable;
   an annular channel formed between said valve housing and said guide, said annular channel connected to said pressure container and, in an open position of said outlet valve, forms a cylindrical opening that opens into said outlet jet;
   said piston having a forward end face facing said outlet jet, said forward end face having an annular valve sealing surface, and a rearward end face on which a suddenly releasable closure pressure acts, wherein, when said outlet valve is closed, a pressure present in said outlet jet acts on an area surrounded by said annular sealing surface and wherein a pressure of said pressure container acts on an area outside of said annular sealing surface; and
   a differential pressure valve for reducing said pressure in said pressure container when a preset pressure differential between said pressure in said pressure container and said closure pressure acting on said rearward end face of said piston is surpassed.

* * * * *